(12) United States Patent
Manabe et al.

(10) Patent No.: US 12,291,106 B2
(45) Date of Patent: May 6, 2025

(54) ELECTRIC VEHICLE AND CONTROL METHOD THEREOF

(71) Applicant: NISSAN MOTOR CO., LTD., Yokohama (JP)

(72) Inventors: Tomoyuki Manabe, Kanagawa (JP); Yukinori Tsukamoto, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 211 days.

(21) Appl. No.: 17/802,322

(22) PCT Filed: Feb. 26, 2020

(86) PCT No.: PCT/IB2020/000139
§ 371 (c)(1),
(2) Date: Aug. 25, 2022

(87) PCT Pub. No.: WO2021/171050
PCT Pub. Date: Sep. 2, 2021

(65) Prior Publication Data
US 2023/0087455 A1    Mar. 23, 2023

(51) Int. Cl.
*B60L 15/20*    (2006.01)
*H02P 5/74*    (2006.01)

(52) U.S. Cl.
CPC .............. *B60L 15/20* (2013.01); *H02P 5/74* (2013.01); *B60L 2240/12* (2013.01); *B60L 2240/421* (2013.01)

(58) Field of Classification Search
CPC ............. B60L 15/20; B60L 2240/12; B60L 2240/421; B60L 15/2054; B60L 2220/42; B60L 2240/423; B60L 2240/425; B60L 2240/485; B60L 2260/28; B60L 1/003; B60L 1/02; B60L 15/2045; H02P 5/74;
(Continued)

(56) References Cited

U.S. PATENT DOCUMENTS 5,372,213 A * 12/1994 Hasebe .................... B60K 1/02
184/6.12
2010/0187044 A1    7/2010 Nabeshima et al.
(Continued)

FOREIGN PATENT DOCUMENTS

JP    2002-078105 A    3/2002
JP    2006183687 A *    7/2006    ......... F16H 57/0413
(Continued)

*Primary Examiner* — Abby Y Lin
*Assistant Examiner* — Dylan M Katz
(74) *Attorney, Agent, or Firm* — Foley & Lardner LLP

(57) ABSTRACT

A method for controlling an electric vehicle driven by a plurality of electric motors including a first electric motor, in which a lubricant, which is used for lubricating the electric motors and power transmission systems therefor, is used for cooling the electric motors is provided. The method includes setting torque distributions for the plurality of electric motors on the basis of a driving force required by the electric vehicle controlling the drive of the plurality of electric motors on the basis of the set torque distributions and circulating intermittently the lubricant used for cooling the first electric motor when the torque distribution set for the first electric motor is smaller than a predetermined value which is regarded as a reference value.

6 Claims, 7 Drawing Sheets

(58) Field of Classification Search
CPC ........ B60K 1/02; B60K 11/02; B60K 17/356; B60K 23/0808; B60K 2001/006; Y02T 10/64; Y02T 10/72
See application file for complete search history.

(56) References Cited

U.S. PATENT DOCUMENTS

| | | | |
|---|---|---|---|
| 2012/0101675 A1* | 4/2012 | Saito | B60W 30/1843 |
| | | | 701/22 |
| 2013/0190954 A1* | 7/2013 | Abihana | B60W 10/06 |
| | | | 180/65.265 |
| 2015/0217645 A1* | 8/2015 | Imamura | B60L 15/2054 |
| | | | 701/22 |
| 2018/0223984 A1* | 8/2018 | Dziuba | F16H 57/0456 |

FOREIGN PATENT DOCUMENTS

| | | |
|---|---|---|
| JP | 2008-048528 A | 2/2008 |
| JP | 2014-151688 A | 8/2014 |
| JP | 2015-136980 A | 7/2015 |

\* cited by examiner

ELECTRIC VEHICLE AND CONTROL METHOD THEREOF

TECHNICAL FIELD

The present invention relates to an electric vehicle having a plurality of electric motors and a control method thereof.

BACKGROUND ART

Conventionally, as an electric vehicle having a plurality of electric motors, there is an electric vehicle in which four wheels (front wheels and rear wheels) are rotationally driven using a plurality of electric motors. For example, JP 2015-136980A discloses a hybrid vehicle that determines torque distributions for a plurality of motor generators in a manner that the loss while driving in the 4WD mode becomes minimized. In this hybrid vehicle, the torque distribution for each motor generator is set on the basis of the torque required by the vehicle in a manner that the electric power loss becomes minimized, and the drive of each motor generator is controlled on the basis of the set torque distribution.

SUMMARY OF INVENTION

In the prior art described above, the torque distribution of one motor generator may be set to 0 in order to minimize power loss. In this case, the drive of the motor generator whose torque distribution is set to 0 is stopped. Here, in the electric vehicle in which a lubricant works for both lubrication and cooling of the motor generator, once the drive of the motor generator is stopped and the circulation of the lubricant is stopped, the lubrication might not be performed properly. On the other hand, when the lubricant continues to circulate as usual during the stop of the drive of the motor generator, the electric power consumption of the cooling system cannot be suppressed, the energy loss increases, and the electric power consumption of the vehicle might increase.

An object of the present invention is to properly lubricate electric motors and power transmission systems therefor and to suppress the electric power consumption of the cooling system.

According to an aspect of the present invention, a method for controlling an electric vehicle is provided. The method for controlling the electric vehicle driven by a plurality of electric motors including a first electric motor, in which a lubricant, which is used for lubricating the electric motors and power transmission systems therefor, is used for cooling the electric motors. The method includes; setting torque distributions for the plurality of electric motors on the basis of a driving force required by the electric vehicle; controlling the drive of the plurality of electric motors on the basis of the set torque distributions; and circulating intermittently the lubricant used for cooling the first electric motor when the torque distribution set for the first electric motor is smaller than a predetermined value which is regarded as a reference value.

DESCRIPTION OF EMBODIMENTS

Embodiments of the present invention will be described below with reference to the accompanying drawings.

First Embodiment

[System Configuration]

Figure 1:
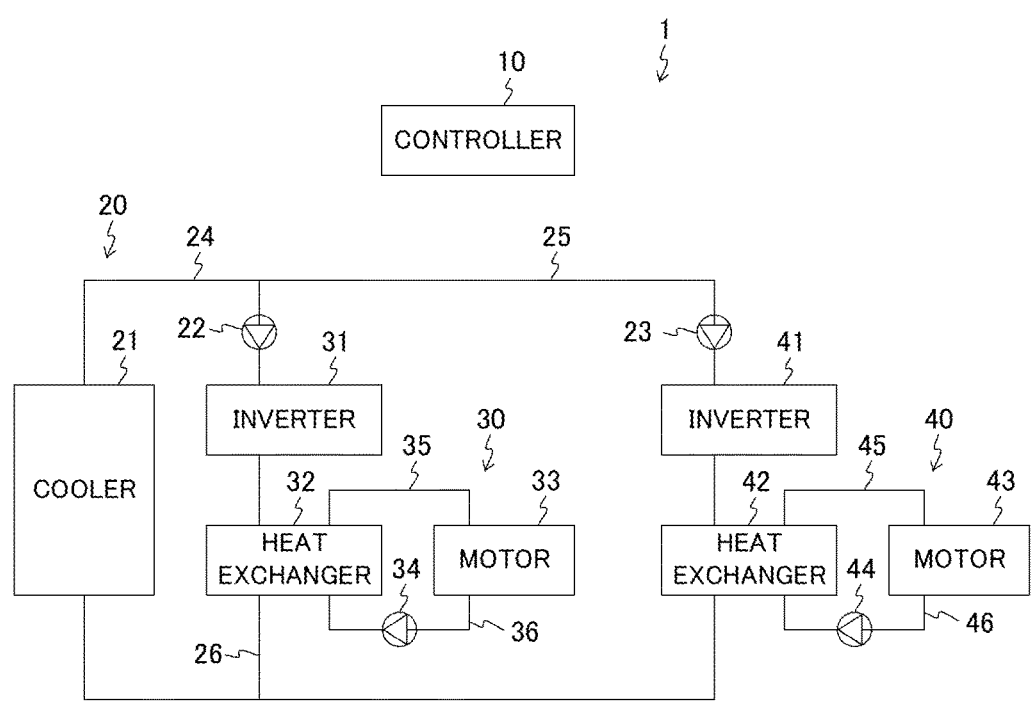
FIG. 1 is a diagram showing a schematic configuration of a vehicle cooling system according to a first embodiment of the present invention.

FIG. 1 is a diagram showing a schematic configuration of a vehicle cooling system 1 according to a first embodiment of the present invention. Notably, the vehicle according to the first embodiment is an electric vehicle of a four-wheel drive vehicle (4WD vehicle) in which motors 33, 43 are provided as drive sources for the drive wheels of front wheels and rear wheels, respectively. That is, the vehicle according to the first embodiment is an electric vehicle in which the front wheels are driven by the motor 33 and the rear wheels are driven by the motor 43.

FIG. 1 shows a cooling system 1 in which a first cooling system 20 is realized by two pumps 22 and 23. Notably, the first cooling system 20 is a water cooling system that cools each unit of the vehicle using cooling water. For example, the first cooling system 20 adjusts the flow rate of cooling water according to the temperature of the cooling water (water temperature). Notably, in the first embodiment, an example in which the first cooling system 20 uses one refrigerant (cooling water) is shown, but each unit may be cooled by the first cooling system 20 using a plurality of refrigerants.

As shown in FIG. 1, the cooling system 1 includes a controller 10, a cooler 21, pumps 22, 23, 34, 44, supply channels 24 to 26, 35, 36, 45, 46, inverters 31, 41, heat exchangers 32, 42, and motors 33, 43. Notably, the first cooling system 20 includes the cooler 21, the pumps 22, 23, and the supply channels 24 to 26. A second cooling system 30 of the front wheel motor 33 includes the heat exchanger 32, the pump 34, and the supply channels 35, 36. A second cooling system 40 of the rear wheel motor 43 includes the heat exchanger 42, the pump 44, and the supply channels 45, 46. Notably, the pumps 22 and 23 are circulation pumps for circulating (pumping) the refrigerant (cooling water) in the first cooling system 20. The pumps 34, 44 are circulation pumps for circulating (pumping) the refrigerant (cooling oil) in the second cooling systems 30, 40. In addition, the pumps 22, 23, 34, 44 can not only be driven or stopped but can also be operated intermittently under the control of the controller 10.

The controller 10 includes a microprocessor, an input/output interface, a ROM (Read Only Memory), a RAM (Random Access Memory), etc., and controls each unit of the vehicle. In the example shown in FIG. 1, the controller 10 controls pumps 22, 23, 34, 44, and inverters 31, 41.

Further, the controller 10 acquires vehicle information (e.g., accelerator pedal depression amount, the speed of the vehicle (vehicle speed)) from each unit of the vehicle, and calculates a driving force (torque command value for the entire vehicle, torque command request for the entire vehicle) required by the vehicle on the basis of the vehicle information. Then, the controller 10 sets torque distributions for the plurality of motors 33, 43 on the basis of the calculated driving force. That is, a driving force required for the front wheels (torque command value) and a driving force required for the rear wheels (torque command value) are set. In this way, the torque distributions for the plurality of motors 33, 43 are determined on the basis of the vehicle information (accelerator pedal depression amount, and the vehicle speed) acquired from each unit of the vehicle. In other words, the torque distributions (e.g., equal division, predetermined ratio) for the plurality of motors 33, 43 are determined in a manner that the behavior of the vehicle becomes desirably. Further, the controller 10 outputs torque command values corresponding to the set torque distributions to the inverters 31, 41. That is, the controller 10 controls the inverters 31, 41 to drive the front wheel motor 33 and the rear wheel motor 43 in a manner that torque distributions become the set torque distributions. In this way, the controller 10 controls the plurality of motors 33, 43 on the basis of the set torque distributions.

Notably, when the torque distribution for the rear wheel motor 43 is set to 0, the controller 10 controls the inverter 41 to stop driving the rear wheel motor 43. That is, when the torque distribution for the rear wheel motor 43 is set to 0, the controller 10 stops the switching operation of the inverter 41 that drives the rear wheel motor 43. For example, the torque distribution for the rear wheels may be 0 in a state where the vehicle is travelling at a somewhat low vehicle speed and in a somewhat constant traffic flow. Further, for example, the torque distribution for the rear wheels may also be 0 when the vehicle speed is low and accelerator pedal depression amount is small. Further, for example, the torque distribution for the rear wheels may also be 0 when there are few torque command requests for the entire vehicle (when the torque command value is small). As described above, the vehicle according to the first embodiment has a function of driving only a part of the front wheels and the rear wheels (front wheels) and stopping the other (rear wheels) when the required torque is small.

The cooler 21 is a radiator attached to the front portion of the vehicle, and is an apparatus for transferring the heat of cooling water to the air outside the vehicle. Further, the cooler 21 is connected to the supply channels 24 to 26 through which cooling water flows. Further, in the example shown in FIG. 1, the supply channel 26 is provided with the pump 22 for circulating cooling water, and the supply channel 25 is provided with the pump 23 for circulating cooling water. Specifically, wind passes through the cooler 21 as the vehicle travels, and the wind cools cooling water inside the cooler 21. Further, the cooling water cooled in the cooler 21 is pumped by the pumps 22, 23 to circulate in the supply channels 24 to 26, thereby cooling the inverters 31, 41 and the heat exchangers 32, 42.

The inverter 31 is a power converter that is connected to the motor 33 and a battery (not shown) and controls the exchange of electricity between the motor 33 and the battery according to an instruction from the controller 10. Further, the inverter 41 is a power converter that is connected to the motor 43 and a battery (not shown) and controls the exchange of electricity between the motor 43 and the battery according to an instruction from the controller 10. Further, the inverter 31 and the heat exchanger 32 are cooled by cooling water flowing through the supply channel 26, and the inverter 41 and the heat exchanger 42 are cooled by cooling water flowing through the supply channel 25.

The heat exchanger 32 is a heat exchanger that lowers the temperature of the front wheel motor 33 by using cooling water flowing through the supply channel 26 and cooling oil flowing through the supply channels 35, 36. Specifically, the heat exchanger 32 is cooled by the cooling water cooled inside the cooler 21 flowing through the supply channel 26. Further, the cooling oil cooled inside the heat exchanger 32 is pumped by the pump 34 to circulate in the supply channels 35, 36, thereby cooling the motor 33.

Further, the heat exchanger 42 is a heat exchanger that lowers the temperature of the rear wheel motor 43 by using cooling water flowing through the supply channel 25 and cooling oil flowing through the supply channels 45, 46. Specifically, the heat exchanger 42 is cooled by the cooling water cooled inside the cooler 21 flowing through the supply channel 25. Further, the cooling oil cooled inside the heat exchanger 42 is pumped by the pump 44 to circulate in the supply channels 45, 46, thereby cooling the motor 43.

As described above, the first cooling system 20 also functions as a cooling system for cooling cooling oil in the second cooling systems 30, 40.

The motor 33 is an electric motor for driving the front wheels of the vehicle and is connected to the battery via the inverter 31. The motor 43 is an electric motor for driving the rear wheels of the vehicle and is connected to the battery via the inverter 41. Notably, as the motors 33, 43, for example, a winding field type synchronous electric motor (EESM) can be used. However, another electric motor (e.g., an induction electric motor or a magnet synchronous electric motor) capable of stopping the switching of the inverter when the required torque is small may be used.

Further, a passage through which cooling oil flows is provided inside or around the motors 33, 43. Then, the cooling oil pumped by the pump 34 circulates in the heat exchanger 32, the motor 33, and the supply channels 35, 36, thereby cooling the motor 33. The cooling oil pumped by the pump 34 also functions as a lubricant for the motor 33 and the power transmission system therefor. Similarly, the cooling oil pumped by the pump 44 circulates in the heat exchanger 42, the motor 43, and the supply channels 45, 46, thereby cooling the motor 43. The cooling oil pumped by the pump 44 also functions as a lubricant for the motor 43 and the power transmission system therefor.

Notably, an oil temperature sensor is mounted on the motor 33, and the inverter 31 detects the oil temperature of the motor 33 on the basis of a signal output from the oil temperature sensor, and outputs the detected result to the controller 10. Similarly, an oil temperature sensor is mounted on the motor 43, and the inverter 41 detects the oil temperature of the motor 43 on the basis of a signal output from the oil temperature sensor, and outputs the detected result to the controller 10.

As described above, the cooling oil used in the second cooling system 30 is used for cooling the motor 33 and also functions as a lubricant (refrigerant lubricating oil) for the motor 33 and the power transmission system therefor. Similarly, the cooling oil used in the second cooling system 40 is used for cooling the motor 43 and also functions as a lubricant (refrigerant lubricating oil) for the motor 43 and the power transmission system therefor. As described above, the second cooling systems 30, 40 are oil lubrication circuits for an electric motor including an apparatus such as a pump for pumping cooling oil and a supply channel for supplying the cooling oil. Also, in the second cooling systems 30, 40, by operating the apparatus such as a pump and the oil supply channel in a state where they are combined, the cooling oil is supplied to each unit to be lubricated. In addition, the action of the second cooling systems 30, 40 can prevent seizure of the lubricated part. In addition, the second cooling systems 30, 40 are provided with apparatuses for cooling the cooling oil (heat exchangers 32 and 42), and this apparatus can prevent the temperature of the cooling oil from rising. Notably, since the second cooling systems 30, 40 use cooling oil, they can also be referred to as an oil cooling system. The second cooling systems 30, 40 can also be referred to as a lubrication cooling apparatus.

Also, during normal operation, the circulation of cooling oil in the second cooling system 30 is controlled on the basis of at least one of the vehicle speed of the electric vehicle, the rotation speed of the front wheel motor 33, and the cooling oil temperature (oil temperature) of the second cooling system 30. Similarly, during normal operation, the circulation of cooling oil in the second cooling system 40 is controlled on the basis of at least one of the vehicle speed of the electric vehicle, the rotation speed of the rear wheel motor 43, and the cooling oil temperature (oil temperature) of the second cooling system 40.

As described above, in the first embodiment, when the torque distribution for the rear wheel motor 43 is set to 0, the drive of the rear wheel motor 43 is stopped. In this way, in a case where the drive of the rear wheel motor 43 is stopped, once the cooling oil used for cooling the motor 43 is circulated as usual, the energy loss may increase due to the circulation of the cooling oil. On the other hand, it is conceivable that when the drive of the rear wheel motor 43 is stopped, the circulation of the cooling oil used for cooling the motor 43 is completely stopped. However, since the cooling oil used for cooling the motor 43 is also used as a lubricant for the motor 43 and the power transmission system therefor, once the circulation of the cooling oil used for cooling the motor 43 is completely stopped, the lubrication of the motor 43 and the power transmission system therefor may be insufficient. In other words, in a case where the torque distribution for the rear wheel motor 43 is set to 0 and the switching operation of the inverter 41 is stopped, since the rear wheel motor 43 and the inverter 41 do not generate heat, there is often no problem in terms of heat. However, even the switching operation of the inverter 41 and the drive of rear wheel motor 43 are stopped, the motor 43 whose drive has been stopped may be rotated by the drive wheels as the vehicle travels. Therefore, since some sliding parts of the motor 43 need to be lubricated, it is necessary to supply cooling oil to the motor 43.

Therefore, in the first embodiment, an example is shown in which when the torque distribution for the rear wheel motor 43 is set to 0, the drive of the rear wheel motor 43 is stopped and cooling oil used for cooling the motor 43 is intermittently circulated (at least temporarily stopped). Note that "intermittently" means performing at regular intervals, but in the present embodiment, the "intermittently" also means that the circulation is performed at a timing (regular timing, irregular timing) satisfying a predetermined condition after a temporarily stop.

That is, when the torque distribution for the rear wheel motor 43 is set to 0, the controller 10 performs control to stop driving the rear wheel motor 43 and to intermittently drive the pump 44 that circulates the cooling oil used for cooling the motor 43. This intermittent drive will be described in detail with reference to FIGS. 2A, 2B and 3.

[Example of Drive Timing of Pump Flow Rate of Cooling Oil During Intermittent Driving]

Figure 2A:
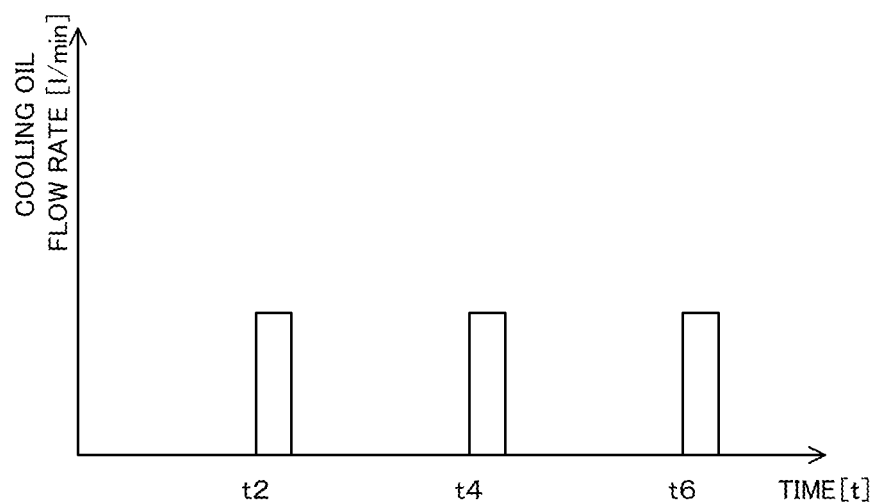
FIG. 2A is a diagram showing the relation between the pump flow rate of cooling oil when the second cooling system for the rear wheel motor is driven intermittently and the elapsed time from the start of intermittent drive.
Figure 2B:
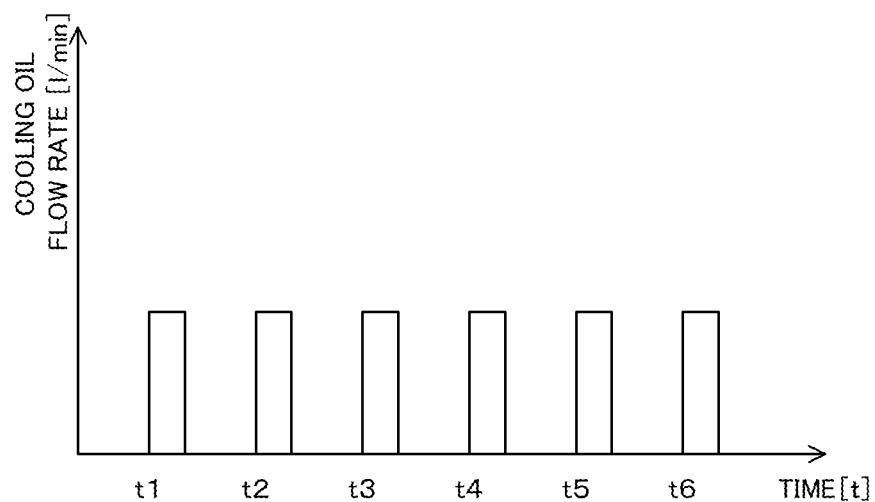
FIG. 2B is a diagram showing the relation between the pump flow rate of cooling oil when the second cooling system for the rear wheel motor is driven intermittently and the elapsed time from the start of intermittent drive.

FIGS. 2A and 2B are diagrams showing the relation between the pump flow rate (vertical axis) of cooling oil when the second cooling system 40 for the rear wheel motor 43 is driven intermittently and the elapsed time (horizontal axis) from the start of intermittent drive. FIGS. 2A, 2B show examples of cases where a threshold value (parameter) used when determining the intermittent drive has been changed. Note that FIGS. 2A and 2B will be described in detail with reference to FIG. 3.

Examples of Second Cooling System Drive Control

Figure 3:
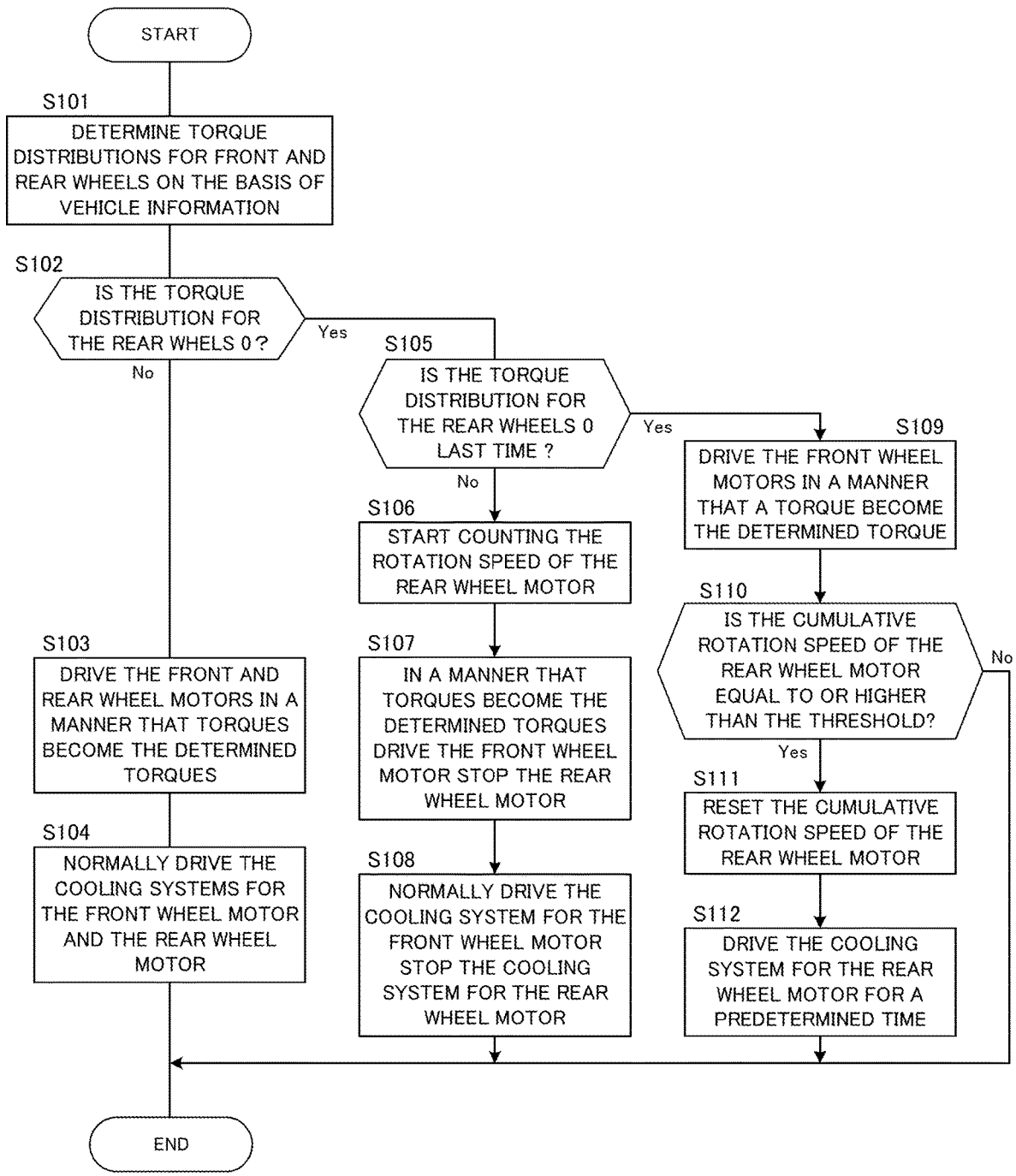
FIG. 3 is a flowchart showing an example of a processing procedure of drive control processing of the second cooling system for the rear wheel motor, which is executed by a controller.

FIG. 3 is a flowchart showing an example of a processing procedure of the drive control processing of the second cooling system 40 for the rear wheel motor 43, which is executed by the controller 10. Note that this processing procedure is a processing programmed in the controller 10 and is repeatedly executed at predetermined intervals (e.g., about several milliseconds).

In step S101, the controller 10 acquires vehicle information (accelerator pedal depression amount, vehicle speed) from each unit of the vehicle, and calculates a driving force (torque command value for the entire vehicle) required by the vehicle on the basis of the vehicle information. Then, the controller 10 sets torque distributions for the plurality of motors 33, 43 on the basis of the calculated driving force. That is, the controller 10 sets torque distributions for the plurality of motors 33, 43 on the basis of the driving force required by the electric vehicle.

In step S102, the controller 10 determines whether or not the torque distribution for the rear wheels is 0. When the torque distribution for the rear wheels is not 0, in step S103, the controller 10 outputs torque command values corresponding to the set torque distributions to the inverters 31, 41. That is, the controller 10 controls the inverters 31, 41 to drive the front wheel motor 33 and the rear wheel motor 43 in a manner that torque distributions become the set torque distributions.

In step S104, the controller 10 normally drives the second cooling system 30 for the front wheel motor 33 and the second cooling system 40 for the rear wheel motor 43. That is, the controller 10 controls the drive of the pumps 34 and 44.

Also, when it is determined in step S102 that the torque distribution for the rear wheels is 0, in step S105, the controller 10 determines whether or not the torque distribution for the rear wheels is also 0 in the last setting. When the torque distribution for the rear wheels is not 0 in the last setting, in step S106, the controller 10 starts counting the rotation speed of the rear wheel motor 43 on the basis of the information from the inverter 41.

In step S107, the controller 10 controls the inverter 31 to drive the front wheel motor 33 in a manner that a torque becomes the set torque in step S101. Also, the controller 10 controls the inverter 41 to stop driving the rear wheel motor 43.

In step S108, the controller 10 normally drives the second cooling system 30 for the front wheel motor 33 and stops the second cooling system 40 for the rear wheel motor 43. That is, the drive of the pump 44 of the second cooling system 40 is stopped.

When it is determined in step S105 that the torque distribution for the rear wheels is also 0 in the last setting, in step S109, the controller 10 controls the inverter 31 to drive the front wheel motor 33 in a manner that a torque becomes the set torque in step S101. Also, the controller 10 controls the inverter 41 to continuously stop the drive of the rear wheel motor 43.

In step S110, the controller 10 determines whether or not a cumulative rotation speed of the rear wheel motor 43, which started counting in step S106, has become equal to or higher than the threshold value TH1. When the cumulative rotation speed of the rear wheel motor 43 is less than the threshold value TH1, the operation of this processing procedure is ended.

When the cumulative rotation speed of the rear wheel motor 43 becomes equal to or higher than the threshold value TH1, in step S111, the controller 10 resets the cumulative rotation speed of the rear wheel motor 43 and starts counting the rotation speed of the rear wheel motor 43.

In step S112, the controller 10 sets the second cooling system 40 for the rear wheel motor 43 to be driven for a predetermined time. That is, the pump 44 of the second cooling system 40 is driven for a predetermined time. Note that, as a predetermined time, a fixed value (e.g., several seconds) may be used, or a value determined from a plurality of values (e.g., 2 seconds, 4 seconds, 6 seconds) on the basis of some rules may be used. For example, a predetermined value may be determined on the basis of the cooling oil temperature (oil temperature) of the second cooling system 40. For example, when the cooling oil temperature is low, it is assumed that the cooling oil stays on the slider for a long time because the viscosity of the cooling oil is high. Therefore, when the cooling oil temperature is low, a relatively short time can be set as a predetermined time. On the other hand, when the cooling oil temperature is high, it is assumed that the cooling oil stays on the slider for a short time because the viscosity of the cooling oil is low. Therefore, when the cooling oil temperature is high, a relatively long time can be set as a predetermined time.

For example, when the vehicle speed is constant, the cumulative rotation speed of the rear wheel motor 43 becomes equal to or higher than the threshold value TH1 at regular intervals. Therefore, as shown in FIGS. 2A and 2B, the drive timing is periodically generated according to the vehicle speed, and the pump 44 of the second cooling system 40 is intermittently driven. Note that FIG. 2A is an example of a case where the threshold value TH1 is set relatively high, and FIG. 2B is an example of a case where the threshold value TH1 is set relatively low.

In this way, when the torque distribution for the rear wheels is 0, the second cooling system 40 is intermittently driven. In this intermittent drive, the drive of the pump 44 is first stopped, and then, the pump 44 is sequentially driven at the timing when the cumulative rotation speed of the rear wheel motor 43 becomes the threshold value TH1.

Notably, the above shows an example in which when the pump 44 is intermittently driven, the drive timing of the pump 44 is determined on the basis of the cumulative rotation speed of the rear wheel motor 43, but the drive timing of the pump 44 may be also determined on the basis of other conditions. For example, the drive timing of the pump 44 may be determined on the basis of the vehicle speed. As described above, the vehicle speed and the rotation speed of the rear wheel motor 43 are in a proportional relation. Therefore, the rotation speed of the rear wheel motor 43 can be sequentially calculated on the basis of the vehicle speed, and the drive timing of the pump 44 can be determined on the basis of the cumulative value of the rotation speed. Also, when the pump 44 is intermittently driven, the drive timing of the pump 44 may be determined on the basis that whether or not the vehicle speed is equal to or higher than a predetermined value. In this case, since the arithmetic processing for calculating the rotation speed of the motor on the basis of the vehicle speed is not required, the processing load of the second cooling system drive control can be reduced.

It is also assumed that the rotation speed of the rear wheel motor 43 cannot be obtained for some reasons after the intermittent drive of the pump 44 is set. In this case, the pump 44 may be intermittently driven at preset intervals (e.g., at intervals of several seconds). Alternatively, a plurality of intermittent drive intervals and the cooling oil temperature (oil temperature) of the second cooling system 40 are registered in association with each other, and on the basis of the cooling oil temperature (oil temperature) of the second cooling system 40, one interval may be determined from the plurality of intermittent drive intervals to execute the intermittent drive of the pump 44. For example, a setting is possible that the frequency of intermittent drive increases when the oil temperature is higher than the reference threshold value (e.g., the frequency shown in FIG. 2B) and the frequency of intermittent drive decreases when the oil temperature is lower than the reference threshold value (e.g., the frequency shown in FIG. 2A). In this way, a control is possible that the circulation of cooling oil in the second cooling system 40 is intermittently performed on the basis of the oil temperature.

As shown above, the vehicle speed of the electric vehicle, the rotation speed of the rear wheel motor 43, and the cooling oil temperature (oil temperature) of the second cooling system 40 can be used as independent parameters. That is, a control is possible that the circulation of cooling oil in the second cooling system 40 is intermittently performed on the basis of at least one of the vehicle speed of the electric vehicle, the rotation speed of the rear wheel motor 43, and the cooling oil temperature (oil temperature) of the second cooling system 40.

Note that although FIG. 3 shows an example in which the threshold value TH1 is set to a constant value, the threshold value TH1 may be changed according to a predetermined rule. For example, the threshold value TH1 may be changed on the basis of the cooling oil temperature (oil temperature) of the second cooling system 40.

As described above, when the oil temperature of cooling oil is low, it is assumed that the cooling oil stays on the slider for a long time because the viscosity of the cooling oil is high. Therefore, it is desirable to decrease the frequency of intermittent drive when the cooling oil temperature is low. On the other hand, when the cooling oil temperature is high, it is assumed that the cooling oil stays on the slider for a short time because the viscosity of the cooling oil is low. Therefore, it is desirable to increase the frequency of intermittent drive when the cooling oil temperature is high.

Therefore, since the frequency of intermittent drive decreases when the cooling oil temperature (oil temperature) of the second cooling system 40 is lower than the reference threshold TH2 (e.g., the threshold value TH2 oil temperature), a relatively high value is set as the threshold TH1. And, since the frequency of intermittent drive increases when the cooling oil temperature (oil temperature) of the second cooling system 40 is higher than the reference threshold value TH2 (e.g., the threshold value TH2<oil temperature), a relatively low value is set as the threshold TH1.

With reference to FIGS. 2A, 2B, FIG. 2A can be grasped as an example of a drive timing when the cooling oil temperature (oil temperature) of the second cooling system 40 is lower than the reference threshold TH2. On the other hand, FIG. 2B can be grasped as an example of a drive timing when the cooling oil temperature (oil temperature) of the second cooling system 40 is higher than the reference threshold value TH2. In this way, the threshold TH1 can be changed on the basis of the oil temperature. That is, the drive timing of the pump 44 can be changed on the basis of the oil temperature. In addition, in this example, two values are set as the threshold value TH1 on the basis of the oil temperature, but three or more values may be set.

Further, an example of using cooling oil as a refrigerant (lubricant, refrigerant lubricating oil) used for cooling and lubricating the motors 33, 43 is shown, but a fluid other than oil (e.g., an inert refrigerant) suitable for lubricating motors may be used. Further, the cooling oil used for cooling and lubricating the motors 33 and 43 may be shared as the oil used for lubricating other units.

As described above, according to the first embodiment, when the torque distribution for the rear wheels is set to 0, the circulation of cooling oil in the second cooling system 40 for the rear wheel motor 43 is temporarily stopped. In this way, by temporarily stopping the circulation of cooling oil in the second cooling system 40, it is possible to suppress the electric power consumption of the cooling system of the vehicle and to reduce the electric power consumption of the vehicle. As a result, the cruising distance of the vehicle can be extended. After the torque distribution for the rear wheels is set to 0 and the circulation of cooling oil in the second cooling system 40 is temporarily stopped, the cooling oil is circulated at a timing satisfying a predetermined condition (e.g., an intermittent timing). As a result, even after the circulation of cooling oil in the second cooling system 40 is temporarily stopped, since the cooling oil is supplied to the rear wheel motor 43 and the power transmission system therefor at a timing satisfying a predetermined condition, it is possible to prevent seizure of each unit (sliding parts that require lubrication, etc.). Thus, according to the first embodiment, the electric motors (motors 33 and 43) and the power transmission systems therefor can be properly lubricated, and the electric power consumption of the cooling system (second cooling system 40) can be suppressed.

Figure 4:
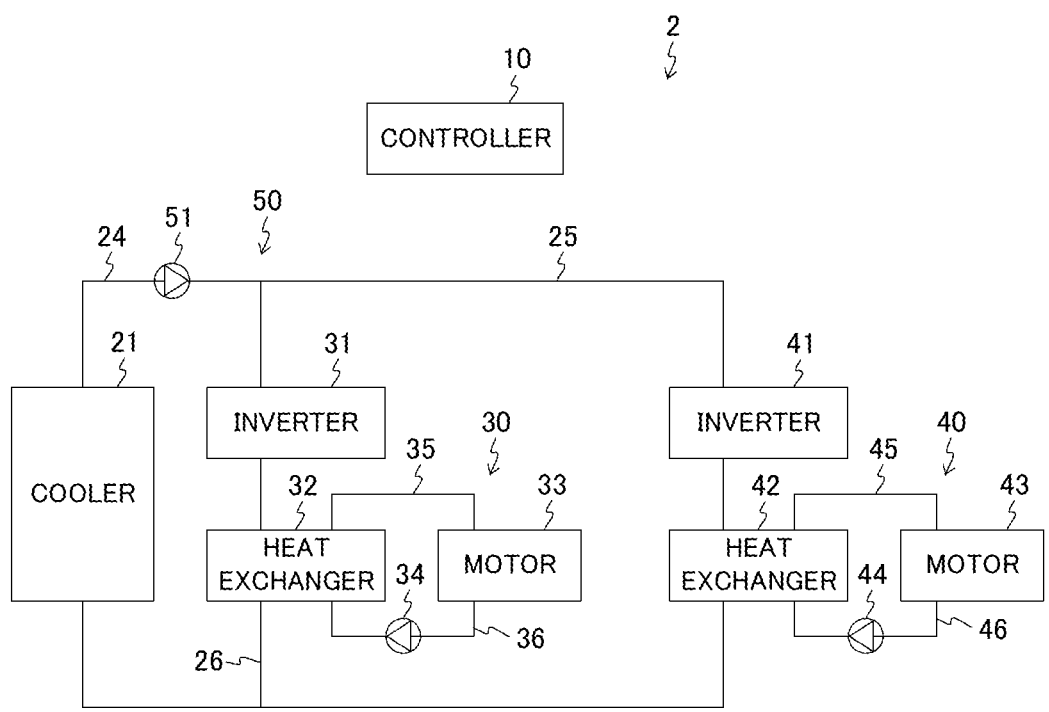
FIG. 4 is a diagram showing a schematic configuration of the vehicle cooling system according to the first embodiment of the present invention.

Notably, although FIG. 1 shows the cooling system 1 in which the first cooling system 20 is realized by two pumps 22 and 23, the first embodiment can also be applied to a case where the number of pumps is 1 or 3 or more. Therefore, FIG. 4 shows a cooling system 2 that realizes a first cooling system 50 with one pump 51. That is, FIG. 4 shows a schematic configuration of the cooling system 2 of the vehicle.

Note that the configuration of the first cooling system 50 is almost the same as that of the first cooling system 20 except that the number of pumps to be provided is different, and therefore the units common to the first cooling system 20 are designated by the same reference numerals and the description thereof is omitted. Further, the pump 51 is a circulation pump for circulating (pumping) the refrigerant (cooling water) in the first cooling system 50, and is provided in the supply channel 24. The cooling water cooled in the cooler 21 is pumped by the pump 51 to circulate in the supply channels 24 to 26, thereby cooling the inverters 31, 41 and the heat exchangers 32, 42. In addition, the pump 51 can not only be driven or stopped but can also be operated intermittently under the control of the controller 10. That is, in the example shown in FIG. 4, the controller 10 controls the pumps 51, 34, 44, and the inverters 31, 41.

Effects of First Embodiment

The method for controlling the electric vehicle according to the first embodiment uses the lubricant, which is used for lubricating the electric motors (motors 33 and 43) and the power transmission systems therefor, for cooling the electric motors, and drives the electric vehicle by a plurality of electric motors including the first electric motor (motor 43). According to this control method, in step S101, the torque distributions for the plurality of electric motors are set on the basis of the driving force required by the electric vehicle. Further, in steps S103, S107, S109, the drive of a plurality of electric motors is controlled on the basis of the torque distributions set in step S101. Further, in steps S108, S112, when the torque distribution set for the first electric motor is smaller than the predetermined value which is regarded as a reference value, the lubricant used for cooling the first electric motor is circulated intermittently.

According to such a method for controlling the electric vehicle, the electric power consumption of the vehicle cooling system can be suppressed and the electric power consumption of the vehicle can be reduced by intermittently circulating the lubricant used for cooling the first electric motor. As a result, the cruising distance of the vehicle can be extended. Also, since the cooling oil is intermittently supplied to the first electric motor and the power transmission system therefor (e.g., at the timing when a predetermined condition is satisfied), it is possible to prevent seizure of each unit (sliding parts that require lubrication, etc.). That is, the electric motors (motors 33 and 43) and the power transmission systems therefor can be properly lubricated, and the electric power consumption of the cooling system (second cooling system 40) can be suppressed.

In addition, according to the method for controlling the electric vehicle according to the first embodiment, when the state continues, in which the torque distribution set for the first electric motor (motor 43) is smaller than the predetermined value which is regarded as the reference value, the timing of circulating the lubricant used for the first electric motor is determined on the basis of at least one of the vehicle speed of the electric vehicle, the rotation speed of the first electric motor, and the temperature of the lubricant used for the first electric motor.

According to such a method for controlling the electric vehicle, it is possible to properly circulate the lubricant used for the first electric motor at a timing determined on the basis of at least one of the vehicle speed of the electric vehicle, the rotation speed of the first electric motor, and the temperature of the lubricant used for the first electric motor. Also, since it is possible to properly circulate the lubricant used for the first electric motor at an appropriate timing in consideration of these three factors, it is possible to prevent seizure of each unit (sliding parts that require lubrication, etc.).

In addition, in the method for controlling the electric vehicle according to the first embodiment, when the torque distribution set for the first electric motor (motor 43) is 0, the lubricant used for the first electric motor is circulated intermittently.

According to such a method for controlling the electric vehicle, the electric power consumption of the vehicle cooling system can be suppressed and the electric power consumption of the vehicle can be reduced by intermittently circulating the lubricant used for cooling the first electric motor when the torque distribution set for the first electric motor (motor 43) is 0. As a result, the cruising distance of the vehicle can be extended.

The electric vehicle according to the first embodiment includes a plurality of electric motors (motors 33, 43), a plurality of pumps (pumps 34, 44), and a controller 10. The plurality of electric motors (motor 33, 43) drive the electric vehicle. The plurality of pumps (pumps 34, 44) are pumps for cooling the electric motors by circulating the lubricant used for lubricating the electric motors and the power transmission systems therefor and for cooling the electric motors, and are provided for each of the plurality of electric motors. The controller 10 controls in a manner of setting torque distributions for the plurality of electric motors on the basis of the driving force required by the electric vehicle, driving the plurality of electric motors on the basis of the set torque distributions, and intermittently driving the pump (pump 44) that cools the first electric motor when the torque distribution set for the first electric motor (motor 43) is smaller than the predetermined value which is regarded as the reference value.

According to such an electric vehicle, the electric power consumption of the vehicle cooling system can be suppressed and the electric power consumption of the vehicle can be reduced by intermittently circulating the lubricant used for cooling the first electric motor. As a result, the cruising distance of the vehicle can be extended. Also, since the cooling oil is intermittently supplied to the first electric motor and the power transmission system therefor (e.g., at the timing when a predetermined condition is satisfied), it is possible to prevent seizure of each unit (sliding parts that require lubrication, etc.). That is, the electric motors (motors 33 and 43) and the power transmission systems therefor can be properly lubricated, and the electric power consumption of the cooling system (second cooling system 40) can be suppressed.

Second Embodiment

In the first embodiment, an example is shown in which the second cooling system 40 for the rear wheel motor 43 is temporarily stopped and then intermittently driven in order to reduce the electric power consumption. In the second embodiment, an example is shown in which the electric power consumption is further reduced by temporarily stopping a part of cooling water in the first cooling system 20. In addition, in the second embodiment, an example of a case where the first cooling system 20 includes two pumps 22 and 23 (shown in FIG. 1) is shown. The second embodiment is an example in which a part of the first embodiment is modified, and the illustration and a part of the description thereof are omitted for the parts common to the first embodiment.

Figure 5:
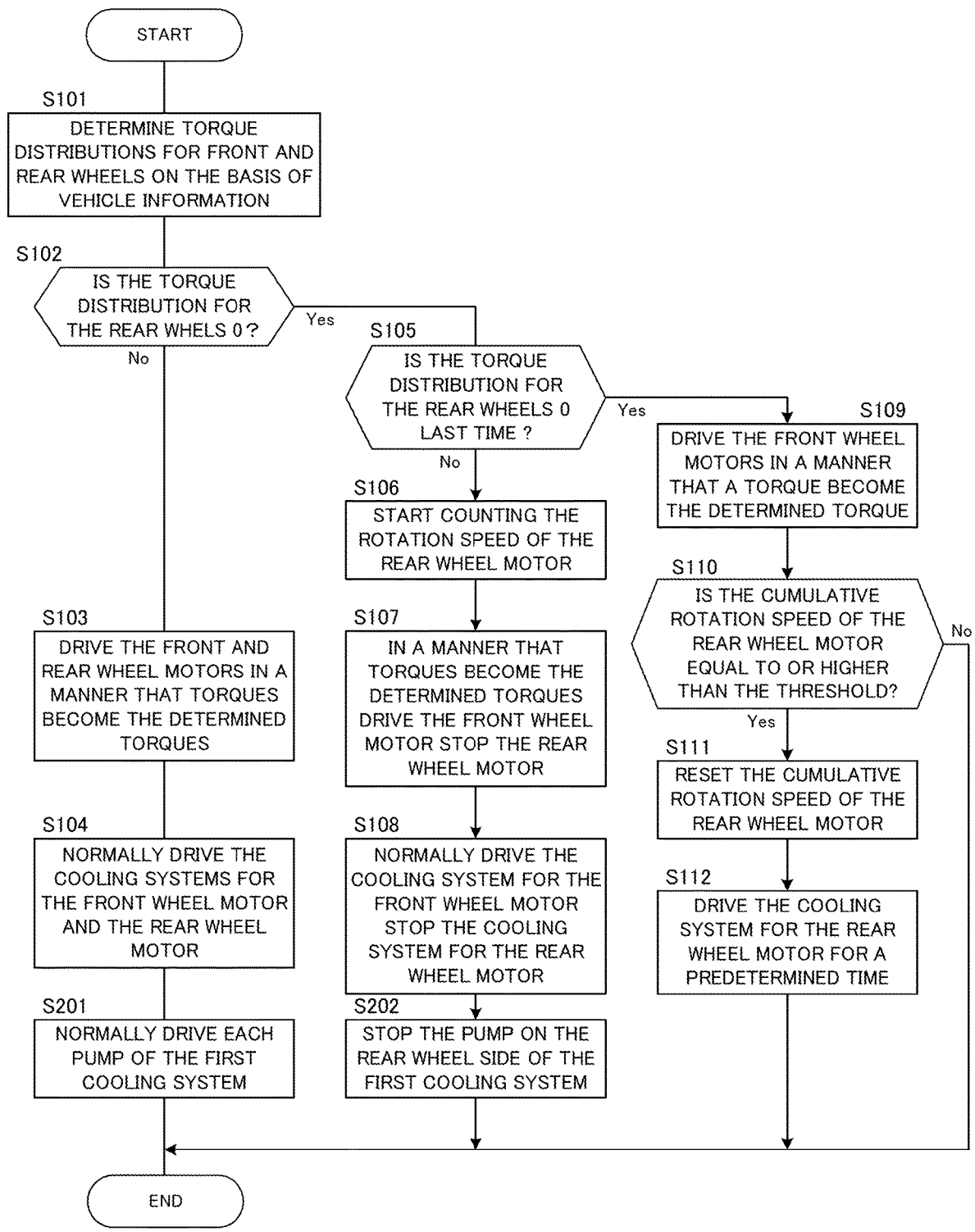
FIG. 5 is a flowchart showing an example of a processing procedure of drive control processing, which is executed by the controller, between a first cooling system and the second cooling system for the rear wheel motor.

FIG. 5 is a flowchart showing an example of a processing procedure of drive control process, which is executed by the controller 10, between the first cooling system 20 and the second cooling system 40 for the rear wheel motor 43. Note that this processing procedure is a processing programmed in the controller 10 and is repeatedly executed at predetermined intervals (e.g., about several milliseconds). Further, this processing procedure is a modification of a part of the processing procedure shown in FIG. 3, and the parts common to the processing procedure shown in FIG. 3 are designated by the same reference numerals, and a part of the description thereof is omitted.

In this processing procedure, an example is shown in which the pump 23 of the first cooling system 20 is stopped when the torque distribution for the rear wheels is 0.

When it is determined in step S102 that the torque distribution for the rear wheels is not 0, in step S103, the front wheel motor 33 and the rear wheel motor 43 are driven. In step S104, the second cooling system 30 for the front wheel motor 33 and the second cooling system 40 for the rear wheel motor 43 are normally driven.

In step S201, the controller 10 normally drives the two pumps 22 and 23 of the first cooling system 20.

When it is determined in step S102 that the torque distribution for the rear wheels is 0 and it is determined in step S105 that the torque distribution for the rear wheels is not 0 in the last setting, in step S106, the counting of the rotation speed of the rear wheel motor 43 is started. In step S107, the front wheel motor 33 is driven and the rear wheel motor 43 is stopped. In step S108, the second cooling system 30 for the front wheel motor 33 is normally driven, and the second cooling system 40 for the rear wheel motor 43 is temporarily stopped.

In step S202, the controller 10 normally drives the pump 22 on the front wheel side and stops the pump 23 on the rear wheel side of the first cooling system 20.

As described above, according to the second embodiment, when the torque distribution for the rear wheels is set to 0, the circulation of cooling oil in the second cooling system 40 for the rear wheel motor 43 is intermittently driven (temporarily stopped), and a part of circulation of cooling water in the first cooling system 20 is stopped. In this way, the electric power consumption of the vehicle cooling system can be suppressed and the electric power consumption of the vehicle can be further reduced by at least temporarily stopping the circulation of cooling oil in the second cooling system 40 and a part of circulation of cooling water in the first cooling system 20. As a result, the cruising distance of the vehicle can be further extended. As described above, according to the second embodiment, the electric motors (motors 33 and 43) and the power transmission systems therefor can be properly lubricated, and the electric power consumption of the cooling systems (first cooling system 20 and second cooling system 40) can be suppressed.

Action and Effect of Second Embodiment

In the method for controlling the electric vehicle according to the second embodiment, when the torque distribution set for the first electric motor (motor 43) is smaller than the predetermined value which is regarded as the reference value, in the cooling system (first cooling system 20) that cools the lubricant (cooling oil) using a refrigerant (cooling water) different from the lubricant, the circulation of the refrigerant in the cooling system that cools the lubricant used for the first electric motor is at least temporarily stopped (the pump 23 on the rear wheel side of the first cooling system 20 is stopped).

According to such a method for controlling the electric vehicle, the electric power consumption of the vehicle cooling system can be suppressed and the electric power consumption of the vehicle can be further reduced by at least temporarily stopping a part of circulation of cooling water in the first cooling system 20. As a result, the cruising distance of the vehicle can be further extended.

Modified Example of Second Embodiment

In the above, an example is shown in which a part of the first cooling system (pump 23 on the rear wheel side) is stopped. Next, an example is shown in which a part of the first cooling system (pump 23 on the rear wheel side) is intermittently driven for the purpose of reducing the electric power consumption. Note that in the modified example of the second embodiment, an example is shown in which the pump 23 on the rear wheel side is intermittently driven on the basis of the temperature of the cooling oil (oil temperature) for lowering the temperature of the rear wheel motor 43. The drive timing will be described in detail with reference to FIGS. 6A to 6C and FIG. 7.

[Example of Relation Between Cooling Water Pump Flow Rate and Cooling Oil for Motor]

Figure 6A:
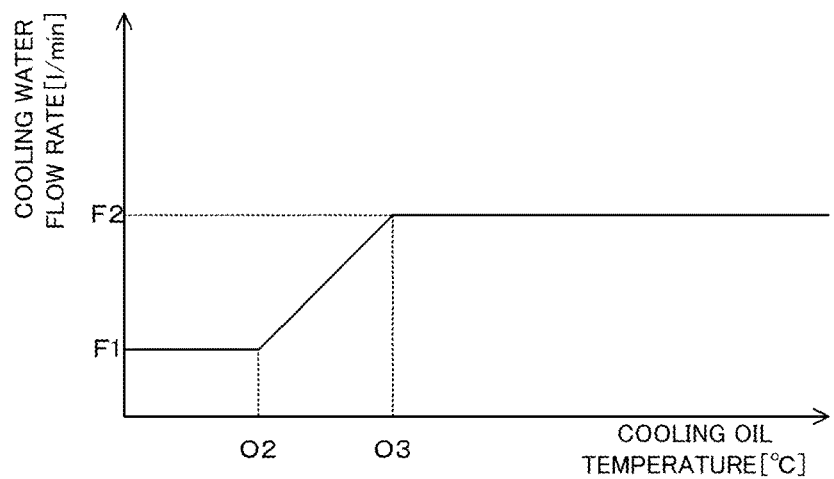
FIG. 6A is a diagram showing the relation between the pump flow rate of cooling water in the first cooling system when the first cooling system is normally driven and the cooling oil temperature (oil temperature) of the second cooling system.

FIG. 6A shows the relation between the pump flow rate (vertical axis) of cooling water in the first cooling system 20 when the first cooling system 20 is normally driven and the cooling oil temperature (oil temperature) (horizontal axis) of the second cooling system 40. Here, the inverter (particularly, a high-power conversion element (e.g., IGPT, power module)) temperature may rise sharply. For example, even when the water temperature is low because the inverter temperature is low, the inverter temperature may rise sharply thereafter. Therefore, when the pump flow rate of cooling water is set to 0 under a state where the inverter temperature and the water temperature are low, once the inverter temperature rises sharply thereafter, there is a risk that the rate at which the cooling water temperature of the first cooling system 20 decreases cannot keep up with the rate at which the inverter temperature increases. Therefore, it is necessary to always supply cooling water when the inverter is driving. Specifically, the pump flow rate of cooling water in the first cooling system 20 is a constant value F1 until the cooling oil temperature (oil temperature) of the second cooling system 40 reaches the predetermined temperature O2.

Then, when the cooling oil temperature (oil temperature) of the second cooling system 40 is equal to or higher than the predetermined temperature O2 and lower than the predetermined temperature O3, the value of the pump flow rate of cooling water in the first cooling system 20 changes from F1 to F2 as the oil temperature rises. When the cooling oil temperature (oil temperature) of the second cooling system 40 is equal to or higher than the predetermined temperature O3, the pump flow rate of cooling water in the first cooling system 20 is a constant value F2 (wherein, F1<F2).

Figure 6B:
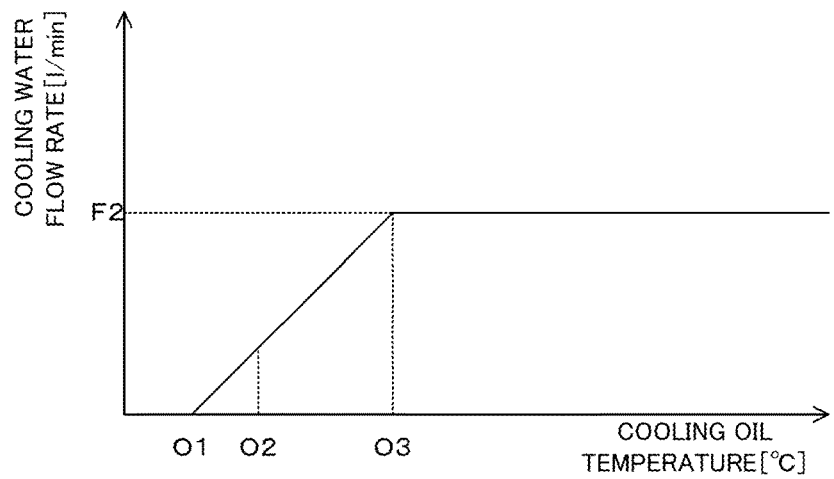
FIG. 6B is a diagram showing the relation between the pump flow rate of cooling water in the first cooling system when the first cooling system is intermittently driven and the cooling oil temperature (oil temperature) of the second cooling system.

FIG. 6B shows the relation between the pump flow rate (vertical axis) of cooling water in the first cooling system 20 when the first cooling system 20 is intermittently driven and the cooling oil temperature (oil temperature) (horizontal axis) of the second cooling system 40. That is, the pump flow rate of cooling water in the first cooling system 20 is stopped until the cooling oil temperature (oil temperature) of the second cooling system 40 reaches the predetermined temperature O1. Then, when the cooling oil temperature (oil temperature) of the second cooling system 40 is equal to or higher than the predetermined temperature O1 and lower than the predetermined temperature O3, the value of the pump flow rate of cooling water in the first cooling system 20 changes from 0 to F2 as the oil temperature rises. When the cooling oil temperature (oil temperature) of the second cooling system 40 is equal to or higher than the predetermined temperature O3, the pump flow rate of cooling water in the first cooling system 20 is a constant value F2 (wherein, F1<F2).

Thus, the normal and intermittent drives of the first cooling system 20 are different before the cooling oil temperature (oil temperature) of the second cooling system 40 reaches the predetermined temperature O2, and are common when the cooling oil temperature is equal to or higher than the predetermined value O2.

Figure 6C:
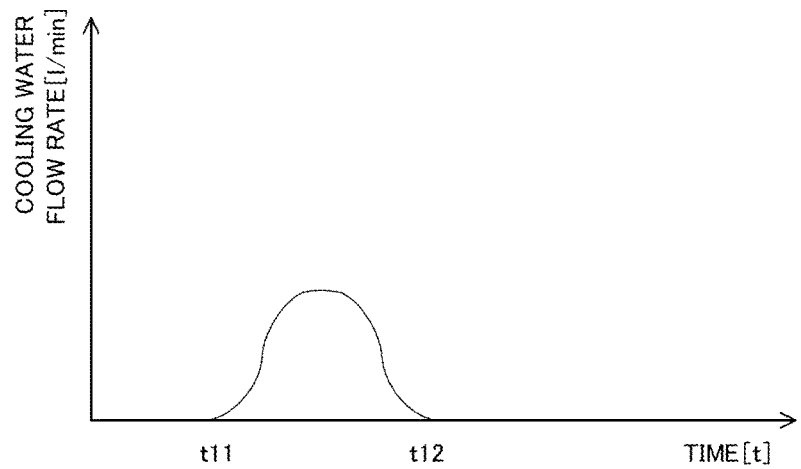
FIG. 6C is a diagram briefly showing an example of the relation between the pump flow rate of cooling water in the first cooling system when the first cooling system is temporarily stopped and the elapsed time from the temporary stop.

FIG. 6C briefly shows an example of the relation between the pump flow rate of cooling water (vertical axis) in the first cooling system 20 when the first cooling system 20 is temporarily stopped, and the elapsed time from the temporary stop (horizontal axis). As shown in FIG. 6C, after temporarily stopping the first cooling system 20, the pump flow rate of the cooling water is 0 when the cooling oil temperature (oil temperature) is less than the predetermined temperature O1 (the period up to t11 shown in FIG. 6C). In addition, once the cooling oil temperature (oil temperature) is equal to or higher than the predetermined temperature O1 (the period from t11 to t12 shown in FIG. 6C), the pump flow rate of the cooling water (wherein, 0<pump flow rate F2) is determined according to the relation shown in FIG. 6B. Once the cooling oil temperature (oil temperature) is less than the predetermined temperature O1 (the period after t12 shown in FIG. 6C), the pump flow rate of the cooling water becomes 0. Note that FIG. 6C briefly shows an example of the drive timing of the cooling water pump 23 in order to facilitate the explanation, and the drive timing is not limited to this.

Example of Cooling System Drive Control

Figure 7:
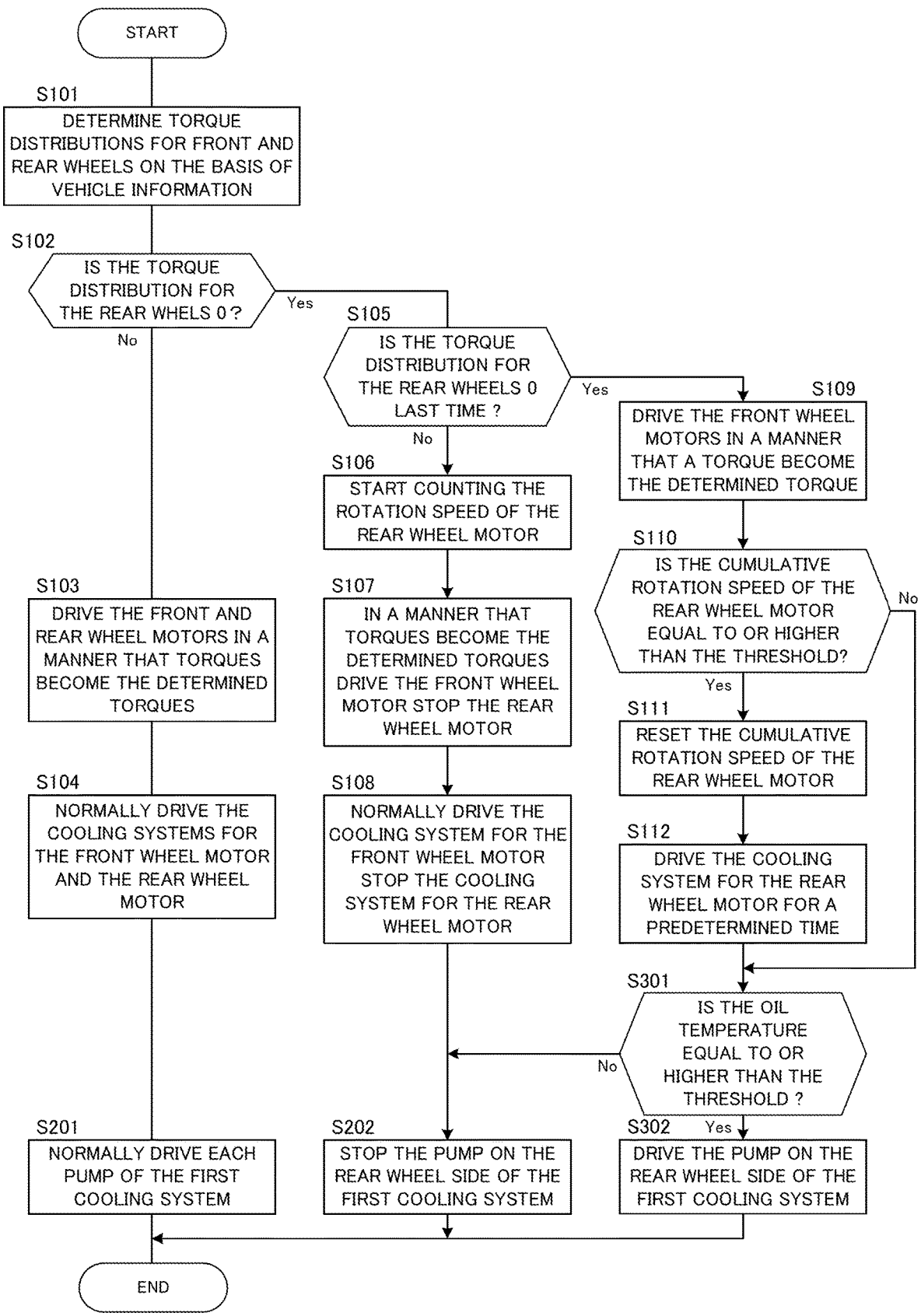
FIG. 7 is a flowchart showing an example of a processing procedure of drive control processing, which is executed by the controller, between the first cooling system and the second cooling system for the rear wheel motor.

FIG. 7 is a flowchart showing an example of a processing procedure of drive control process, which is executed by the controller 10, between the first cooling system 20 and the second cooling system 40 for the rear wheel motor 43. This processing procedure is a processing programmed in the controller 10 and is repeatedly executed at predetermined intervals (e.g., about several milliseconds). Further, this processing procedure is a modification of a part of the processing procedure shown in FIG. 5, and the parts common to the processing procedure shown in FIG. 5 are designated by the same reference numerals, and a part of the description thereof is omitted. Note that the threshold value TH3 shown in this example corresponds to O1 shown in FIG. 6B.

In step S112, it is set to drive the second cooling system 40 for the rear wheel motor 43 for a predetermined time, and then in step S301, the controller 10 determines whether the cooling oil temperature (oil temperature) of the second cooling system 40 for the rear wheel motor 43 is equal to or higher than the threshold value TH3.

When it is determined in step S301 that the oil temperature is less than the threshold value TH3, the process returns to step S202, and the controller 10 stops the pump 23 on the rear wheel side of the first cooling system 20. Note that during the stop of the pump 23 on the rear wheel side, the stop continues. On the other hand, when it is determined in step S301 that the oil temperature is equal to or higher than the threshold value TH3, in step 302, the controller 10 drives the pump 23 on the rear wheel side of the first cooling system 20. In this case, the drive of the pump 23 is controlled according to the relation shown in FIG. 6B. Note that during the drive of the pump 23 on the rear wheel side, the drive continues.

Note that FIG. 7 shows an example in which the pump 23 of the first cooling system 20 is driven on the basis that whether or not the cooling oil temperature (oil temperature) of the second cooling system 40 is equal to or higher than the threshold value TH3. However, the pump 23 of the first cooling system 20 may be driven on the basis of other conditions. For example, the pump 23 of the first cooling system 20 may be driven on condition that the circulation of cooling oil in the second cooling system 40 for the rear wheel motor 43 is restarted. Also, for example, the pump 23 of the first cooling system 20 may be driven at a timing when the circulation of cooling oil in the second cooling system 40 for the rear wheel motor 43 is about to be restarted. That is, the pump 23 of the first cooling system 20 may be driven on the basis of the timing of driving the circulation of cooling oil in the second cooling system 40 for the rear wheel motor 43 or before and after the driving. In other words, the pump 23 of the first cooling system 20 may be driven on the basis of the drive timing of the circulation of cooling oil in the second cooling system 40 for the rear wheel motor 43.

Thus, according to the modified example of the second embodiment, when the torque distribution for the rear wheels is set to 0, the circulation of cooling oil in the second cooling system 40 for the rear wheel motor 43 is intermittently driven (temporarily stopped), and a part of circulation of cooling water in the first cooling system 20 is intermittently driven (temporarily stopped). In this way, the electric power consumption of the vehicle cooling system can be suppressed and the electric power consumption of the vehicle can be further reduced by temporarily stopping the circulation of cooling oil in the second cooling system 40 and a part of circulation of cooling water in the first cooling system 20. As a result, the cruising distance of the vehicle can be further extended. After the torque distribution for the rear wheels is set to 0 and a part of circulation of cooling water in the first cooling system 20 is temporarily stopped, the cooling water is circulated at a timing satisfying a predetermined condition (oil temperature is equal to or higher than the threshold TH3). As a result, even after a part of circulation of cooling water in the first cooling system 20 is temporarily stopped, the circulation of the cooling water is restarted at the timing when a predetermined condition is satisfied, so that proper cooling of the entire vehicle can be realized. As described above, according to the second embodiment, the electric motors (motors 33 and 43) and the power transmission systems therefor can be properly lubricated, and the electric power consumption of the cooling systems (first cooling system 20 and second cooling system 40) can be suppressed.

Action and Effect of the Modified Example of Second Embodiment

In the method for controlling the electric vehicle according to modified example of the second embodiment, when the state continues, in which the torque distribution set for the first electric motor (motor 43) is smaller than the predetermined value which is regarded as the reference value, the refrigerant is intermittently circulated in the cooling system (first cooling system 20) for cooling the lubricant used for the first electric motor (the pump 23 on the rear wheel side of the first cooling system 20 is intermittently driven).

According to such a method for controlling the electric vehicle, by intermittently driving a part of circulation of cooling water in the first cooling system 20, the electric power consumption of the vehicle cooling system can be suppressed and the electric power consumption of the vehicle can be reduced. Further, since a part of circulation of cooling water in the first cooling system 20 is intermittently driven, proper cooling of the entire vehicle can be realized.

In the method for controlling the electric vehicle according to modified example of the second embodiment, when the state continues, in which the torque distribution set for the first electric motor (motor 43) is smaller than the predetermined value which is regarded as the reference value, the timing of circulating the refrigerant in the cooling system (first cooling system 20) that cools the lubricant used for the first electric motor is determined on the basis of the temperature (oil temperature) of the lubricant (cooling oil) used for the first electric motor (the timing of driving the pump 23 on the rear wheel side of the first cooling system 20 is determined).

According to such a method for controlling the electric vehicle, it is possible to properly circulate the refrigerant in the cooling system (first cooling system 20) at an appropriate timing in consideration of the temperature (oil temperature) of the lubricant (cooling oil) used for the first electric motor.

In the first and second embodiments, in order to facilitate the explanation, an example is shown in which the drive of the rear wheel motor 43 is stopped when the torque distribution for the rear wheels is set to 0. However, the present invention is not limited to this. For example, when the torque distribution for the rear wheels is smaller than the predetermined value (predetermined lower limit torque) which is regarded as the reference value (for example, when the torque distribution for the rear wheels is smaller than or equal to the predetermined value, when the torque distribution for the rear wheels is smaller than the predetermined value), the drive of the rear wheel motor 43 may be stopped. In this way, when the drive of the rear wheel motor 43 is stopped, as shown in the first and second embodiments, the pump 44 of the second cooling system 40 can be temporarily stopped and intermittently driven, and the pump 23 of the first cooling system 20 can be temporarily stopped and intermittently driven. As the predetermined value shown here, for example, ±0.5 Newton (N) can be used.

While the embodiments of the present invention have been described above, the above-described embodiments only show a part of application examples of the present invention and are not intended to limit the technical scope of the present invention to the specific configurations of the above-described embodiments.

The invention claimed is:
1. A method for controlling an electric vehicle driven by a plurality of electric motors including a first electric motor, in which a lubricant, which is used for lubricating the electric motors and power transmission systems therefor, is used for cooling the electric motors, the method comprising:
setting torque distributions for the plurality of electric motors on the basis of a driving force required by the electric vehicle;

controlling the drive of the plurality of electric motors on the basis of the set torque distributions; and intermittently circulating the lubricant used for cooling the first electric motor responsive to the torque distribution set for the first electric motor being less than or equal to a predetermined value which is regarded as a reference value, wherein:

when the torque distribution set for the first electric motor is less than or equal to the predetermined value which is regarded as the reference value, in a cooling system that cools the lubricant with a refrigerant different from the lubricant, the circulation of the refrigerant in the cooling system that cools the lubricant used for the first electric motor is stopped at least temporarily.

2. The method for controlling the electric vehicle according to claim 1, wherein:

when a state continues, in which the torque distribution set for the first electric motor is less than or equal to the predetermined value which is regarded as the reference value, a timing of circulating the lubricant used for the first electric motor is determined on the basis of at least one of the vehicle speed of the electric vehicle, the rotation speed of the first electric motor, and the temperature of the lubricant used for the first electric motor.

3. The method for controlling the electric vehicle according to claim 1, wherein:

when a state continues, in which the torque distribution set for the first electric motor is less than or equal to the predetermined value which is regarded as the reference value, the refrigerant in the cooling system that cools the lubricant used for the first electric motor is intermittently circulated.

4. The method for controlling the electric vehicle according to claim 3, wherein:

when a state continues, in which the torque distribution set for the first electric motor is less than or equal to the predetermined value which is regarded as the reference value, a timing of circulating the refrigerant in the cooling system that cools the lubricant used for the first electric motor is determined on the basis of the temperature of the lubricant used for the first electric motor.

5. The method for controlling the electric vehicle according to claim 1, wherein:

the predetermined value is 0; and when the torque distribution set for the first electric motor is 0, the lubricant used for the first electric motor is intermittently circulated.

6. An electric vehicle, comprising:

a plurality of electric motors that drive the electric vehicle;

a plurality of pumps that cools the electric motors by circulating a lubricant, which is used for lubricating the electric motors and power transmission systems therefor and for cooling the electric motors, and that are provided for each of the plurality of electric motors; and a controller that is configured to set the torque distributions for the plurality of electric motors on the basis of the driving force required by the electric vehicle and control the drive of the plurality of electric motors on the basis of the set torque distributions, wherein:

the controller is configured to cause the pumps to intermittently circulate the lubricant that cools the first electric motor responsive to the torque distribution set for the first electric motor included in the plurality of electric motors being less than or equal to is the predetermined value which is regarded as a reference value, and when the torque distribution set for the first electric motor is less than or equal to the predetermined value which is regarded as the reference value, in a cooling system that cools the lubricant with a refrigerant different from the lubricant, the circulation of the refrigerant in the cooling system that cools the lubricant used for the first electric motor is stopped at least temporarily.

\* \* \* \* \*